(12) United States Patent
Bergeron et al.

(10) Patent No.: US 9,452,406 B2
(45) Date of Patent: Sep. 27, 2016

(54) BUBBLE ENCAPSULATION VIA SILICILIC ACID COMPLEXATION

(71) Applicant: L'OREAL, Paris (FR)

(72) Inventors: Vance Bergeron, Francheville (FR); Jean-Thierry Simonnet, Mamaroneck, NY (US); Florence Levy, Paris (FR); Aurelie Lafuma, Paris (FR); Stephane Santucci, Lyons (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 13/896,655

(22) Filed: May 17, 2013

(65) Prior Publication Data

US 2014/0341953 A1 Nov. 20, 2014

(51) Int. Cl.
*B01J 13/00* (2006.01)
*A23L 1/00* (2006.01)
*B01J 13/02* (2006.01)

(52) U.S. Cl.
CPC .......... *B01J 13/0095* (2013.01); *A23L 1/0097* (2013.01); *B01J 13/02* (2013.01)

(58) Field of Classification Search
None
See application file for complete search history.

(56) References Cited

U.S. PATENT DOCUMENTS

| | | | |
|---|---|---|---|
| 3,661,602 A | 5/1972 | Gerow | |
| 3,725,095 A * | 4/1973 | Weldman et al. | 106/603 |
| 5,900,394 A | 5/1999 | Goel et al. | |
| 6,107,358 A * | 8/2000 | Harada et al. | 521/133 |
| 6,159,453 A | 12/2000 | Avnir et al. | |
| 6,238,650 B1 | 5/2001 | Lapidot et al. | |
| 6,248,315 B1 | 6/2001 | Young et al. | |
| 6,620,407 B1 | 9/2003 | Gers-Barlag et al. | |
| 6,677,389 B2 * | 1/2004 | Fukuda et al. | 516/84 |
| 7,670,999 B2 | 3/2010 | Sebillotte-Arnaud et al. | |
| 2002/0192180 A1 | 12/2002 | Fairley et al. | |
| 2004/0241120 A1 | 12/2004 | Pataut et al. | |
| 2007/0258933 A1 | 11/2007 | Bui et al. | |
| 2007/0258934 A1 | 11/2007 | Bui et al. | |
| 2007/0275257 A1* | 11/2007 | Muraguchi et al. | 428/522 |
| 2007/0292676 A1 | 12/2007 | Naigertsik et al. | |
| 2008/0199526 A1 | 8/2008 | Poschalko et al. | |
| 2009/0325780 A1 | 12/2009 | Gauckler et al. | |
| 2011/0158923 A1 | 6/2011 | Galeone et al. | |
| 2011/0293677 A1 | 12/2011 | Bekemeier et al. | |
| 2011/0311723 A1 | 12/2011 | Bekemeier et al. | |

FOREIGN PATENT DOCUMENTS

| | | | |
|---|---|---|---|
| DE | 19834819 A1 | 2/2000 | |
| EP | 0107177 A2 | 5/1984 | |
| EP | 1038573 A2 | 9/2000 | |
| EP | 1627668 A1 | 2/2006 | |
| EP | 1759690 A2 | 3/2007 | |
| EP | 2436452 A1 | 4/2012 | |
| GB | 2131820 A | 6/1984 | |
| JP | S627632 A | 1/1987 | |
| JP | S62164617 A | 7/1987 | |
| JP | 2004002275 A | 1/2004 | |
| JP | 2005-145876 A | 6/2005 | |
| WO | 9400508 A1 | 1/1994 | |
| WO | 9614145 A1 | 5/1996 | |
| WO | 2014184658 A2 | 11/2014 | |
| WO | 2014184659 A2 | 11/2014 | |
| WO | 2014184660 A2 | 11/2014 | |

OTHER PUBLICATIONS

Amphoteric Surfactants, 2nd Ed., vol. 59, Surfactant Science Series, E G. Lomax, ed., Marcel Dekker, New York, 1996, pp. 121.
Sinks B.P., et al., "Enhanced Stabilization of Emulsions Due to Surfactant-Induced Nanoparticle Flocculation," Langmuir, 2007, vol. No. 23 (14), pp. 7436-7439.
Kinks B.P., et al., "Synergistic Interaction in Emulsions Stabilized by a Mixture of Silica Nanoparticles and Cationic Surfactant," Langmuir, 2007, vol. No. 23 (7), pp. 3626-3636.
Database WPI Week 198708 Thomson Scientific, London, GB; AN 1987-052881 XP002732259.
Database WPI Week 198734 Thomson Scientific, London, GB; AN 1987-240057 XP002732260.
Dickinson et al., "Food emulsions and foams Stabilization by particles," Current Opinion in Colloid and Interface Science, London, GB, XP026896477, vol. 15, No. 1-2, (Apr. 1, 2010), pp. 40-49.
Hunter et al., "The role of particles in stabilising foams and emulsions," Advances in Colloid and Interface Science, Elsevier, NL, XP 022510900, vol. 137, No. 2, (Mar. 4, 2008), pp. 57-81.
International Search Report for Application No. PCT/IB2014/001467, mailed Jan. 26, 2015, 3 pages.
International Search Report for Application No. PCT/IB2014/001485, mailed Nov. 25, 2014, 4 pages.
International Search Report for Application No. PCT/IB2014/001487, mailed Jan. 7, 2015, 4 pages.
Kaptay, G., "Interfacial Criteria for Stabilizing of Liquid Foams by Solid Particles," Colloids and Surfaces, A. Physicachemical and Engineering Aspects, Elsevier, Amsterdam, NL, XP008068726, vol. 230, No. 1-03, (Jan. 1, 2001), pp. 67-80.
Lherminier: "Etude mecanique et rheophysique de mousses encapsulees," (Jun. 26, 2013), XP055151733, Retrieved from the Internet: URL: http://www.ens-lyon.fr/DSM/SDMsite/M2/stages_M2/Lherminier2013.pdf [retrieved on Nov. 7, 2014], pp. 6-7.
Stamkulov, N SH et al., "Stabilisation of emulsions by using a comgination of an oil soluble ionic surfactant and water soluble polyelectrolytes. I: Emulsion stabilisation and Interfacial tension measurments," Colloids and Surfaces, A. Physicachemical and Engineering Aspects, Elsevier, Amsterdam, NL, XP026654191, vol. 335, No. 1-3, (Mar. 5, 2009), pp. 103-106.
Stocco, Antonio et al., "Particle-stabilised foams: an interfacial study," Soft Matter, XP055163020, vol. 5, No. 11 (Jan. 1, 2009), pp. 2215-2222.
Velikov K.P., et al., "Direct Observation of the Dynamics of Latex Particles Confined inside Thinning Water-Air Films," Langmuir, 1998, vol. 14, pp. 1148-1155.

(Continued)

*Primary Examiner* — Robert A Wax
*Assistant Examiner* — Danah Al-Awadi
(74) *Attorney, Agent, or Firm* — The Marbury Law Group, PLLC.

(57) ABSTRACT

Disclosed are methods of preparing stable gas-in-water dispersions by silicic acid complexation of micron-sized gas bubbles, and stable dispersions prepared by silicic acid complexation. Compositions and products comprising the dispersions are also disclosed. Dispersions may be stable over an extended period of time at room temperature.

23 Claims, 2 Drawing Sheets

(56) References Cited

OTHER PUBLICATIONS

Wang, J. et al., "Synergistic stabilization of emulsions by poly(oxypropylene)diamine and Laponite particles," Colloids and Surfaces, A, Physicachemical and Engineering Aspects, Elsevier, Amsterdam, NL, vol. 353, No. 2-3, XP026806479, (Jan. 15, 2010), pp. 117-124.

Whitby, C.P. et al., "Effect of oil soluble surfactant in emulsions stabilised by clay particles," Journal of Colloid and Interface Science, Academic Press, NY, NY, vol. 323, No. 2, (Jul. 15, 2008), pp. 411-416.

International Preliminary Report on Patentability for PCT/IB2014/001485 (Nov. 26, 2015).

International Preliminary Report on Patentability for PCT/IB2014/001487 (Nov. 26, 2015).

International Preliminary Report on Patentability for PCT/IB2014/001467 (Nov. 26, 2015).

Falcone, "The Effect of Degree of Polymerization of Silicates on Their Interactions with Cations in Solution"; In Soluble Silicates; ACS Symposium Series; American Chemical Society; 1982; 16 pages.

Pub Chem "Sodium Meta Siliciate"; accessed Sep. 21, 2015; 32 pages.

\* cited by examiner

BUBBLE ENCAPSULATION VIA SILICILIC ACID COMPLEXATION

FIELD OF THE DISCLOSURE

The disclosure relates to dispersions useful in a variety of applications, and methods for preparing the dispersions. The dispersions according to the disclosure may exhibit improved stability over an extended period of time, such as for several months, even when stored at room temperature.

BACKGROUND

Products in the form of aerated dispersions (e.g. gas-in-water dispersions) are known, such as, for example, foams such as mousse products for styling the hair, as well as whipped cream and other food products that are dispensable from an aerosol can. Such products, however, are known to have poor stability, in particular at room temperature.

Past attempts to formulate stable products have had the drawback that the product is affected by the addition of surfactants, polymers, and changes in temperature and/or pH. Other past methods for preparing and stabilizing formulated products utilize components that are toxic and/or produce by-products that can present health hazards and/or introduce prohibitive cost constraints to remove or neutralize them. Additionally, some aerated products are proposed in aerosol cans that simultaneously inject gas and solution, or that must be prepared and kept under frozen conditions to remain stable.

Further problems with the current methods for generating aerated products with particles at the gas-solution interface is that they concern foams and not gas-phase dispersions—that is, the systems have gas-phase volume fractions greater than 64%. In these systems the individual bubbles touch and stick together which makes it difficult to subsequently re-disperse the gas bubble into solution. Furthermore, only hydrophobic particles can be used to achieve even moderate stability.

U.S. Pat. No. 3,661,602 discloses a method of stabilizing aqueous foams that incorporates certain silanes to prepare a stable, rigid foam that is "set" upon drying. U.S. Pat. No. 3,725,095 discloses a method of stabilizing aqueous foams with a combination of a cationic surfactant, colloidal silica particles, and an alkaline ionic silicate. The foams in both of these disclosures, however, isolate the gas bubbles in a solid, continuous matrix.

In addition to avoiding the above-mentioned drawbacks, there is also a desire in certain industries, such as, for example, the food, cosmetic, and consumer chemical (e.g. household product) industries, to prepare products that have certain properties, such as the ability to be further diluted, for instance, which the two references mentioned do not provide.

Thus, there remains a need for methods to prepare gas-in-water dispersions that provide the desired properties and which can be used in a variety of applications and industries, while providing increased stability of the dispersion and the formulated product.

SUMMARY

It has been discovered that gas-in-water dispersions prepared via silicic acid complexation allow for the formation of a rigid interface between the gas bubble and the water phase. The bubbles can be individually encapsulated, which may prevent coalescence or so-called Oswald-ripening, resulting in increased stability.

According to various embodiments of the disclosure, gas-in-water dispersions can be prepared where the dispersed phase comprises gas bubbles, and the continuous phase comprises a surface-active material, by any method known. Separately, a solution of silicate salts is prepared and the pH adjusted so that silicic acid is produced, creating anionic complexes that are attracted to the cationic surface of the bubbles. This process leads to encapsulation of the bubbles, and gas-in-water dispersions having improved stability over extended periods of time.

DESCRIPTION OF EXEMPLARY EMBODIMENTS

Figure 1:
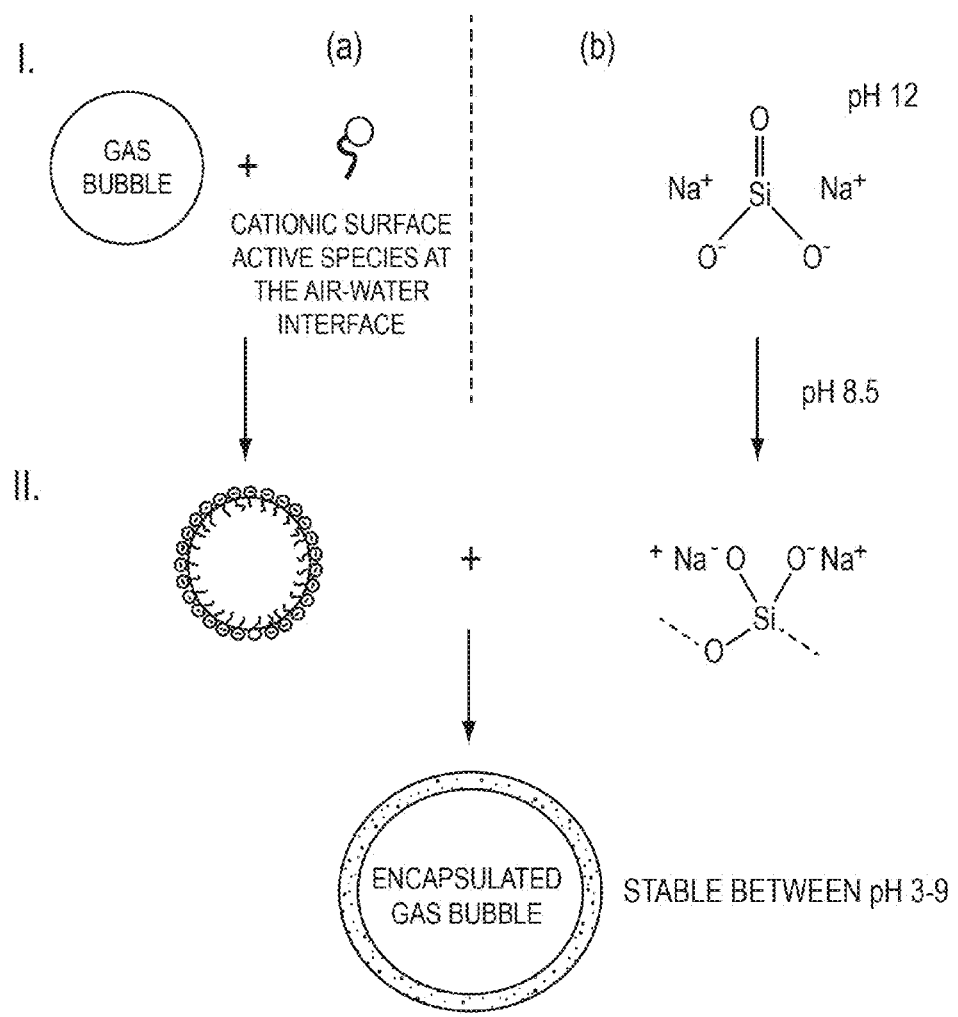
FIG. 1 is a schematic of an exemplary encapsulation process, according to an embodiment of the disclosure.

The disclosure relates to gas-in-water dispersions prepared via silicic acid complexation, and methods of preparing such dispersions.

The encapsulation process may, in various embodiments, comprise steps of preparing a gas-in-water dispersion, where the dispersed phase comprises gas bubbles and the continuous phase comprises a surface-active material. This may be done by any method known, such as, for example, by high speed blender (e.g. ultralux), rotor-stator, Mondomix, whisk, etc.

According to various embodiments of the disclosure, the gas-in-water dispersion comprises, for example, less than about 65%, such as less than about 60%, less than about 55%, less than about 50%, less than about 40%, or less than about 30%, of the dispersed (gas) phase, in the form of bubbles.

The gas bubbles of the dispersed phase may, according to various embodiments, be in the range of micron-sized. For example, the bubbles may range up to about 1500 µm, such as up to about 1000 µm, up to about 750 µm, or up to about 500 µm. By way of non-limiting example only, the bubbles may range from about 5 µm to about 1500 µm, such as about 10 µm to about 1000 µm, about 5 µm to about 1000 µm, about 10 µm to about 1500 µm, about 10 µm to about 750 µm, about 10 µm to about 500 µm, about 50 µm to about 1000 µm, about 50 µm to about 750 µm, about 50 µm to about 500 µm, or about 50 µm to about 250 µm. In further embodiments, the bubbles may range from about 30 µm to about 250 µm, such as about 30 µm to about 100 µm or about 50 µm to about 100 µm.

The dispersed phase may comprise any type of gas in the dispersion that may be useful according to the industry or application of interest. One of skill in the art will be able to select an appropriate gas for the particular formulation. By way of non-limiting example, the gasses may be chosen from $O_2$, $N_2$, $CO_2$, $N_2O$, helium, and combinations thereof.

The continuous phase may be aqueous, and may comprise at least one surface active agent. By way of example only, the at least one surface active agent may be chosen from cationic surface active agents, as well as from amphoteric surface active agents or other molecules that may be pH-adjusted such that they become cationic. The at least one surface active agent may be present in an amount ranging from about 0.5 to about 50 times the Critical Micellar Concentration ("CMC") of the dispersion, such as, for example, about 0.5 to about 40 times the CMC, about 1 to about 40 times the CMC, about 1 to about 25 times the CMC, or about 1 to about 15 times the CMC.

Exemplary, non-limiting cationic surface active agents include optionally polyoxyalkylenated primary, secondary and tertiary fatty amines, quaternary ammonium salts, and mixtures thereof.

Exemplary quaternary ammonium salts may be chosen from:
  those of the general formula (I) below:

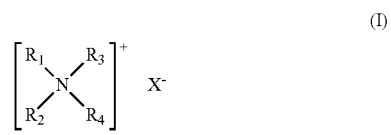

wherein $R_1$, $R_2$, $R_3$, and $R_4$, which may be identical or different, are chosen from linear and branched aliphatic radicals comprising from 1 to 30 carbon atoms, and aromatic radicals; and X— is chosen from halides, phosphates, acetates, lactates, (C2-C6) alkyl sulfates, and alkyl- or alkylaryl-sulfonates;
quaternary ammonium salts of imidazoline;
diquaternary ammonium salts of formula (II):

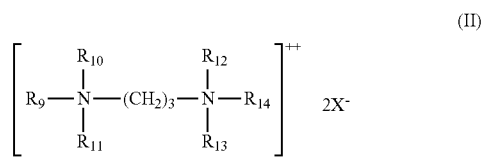

wherein $R_9$ is chosen from aliphatic radicals comprising from 16 to 30 carbon atoms; $R_{10}$, $R_{11}$, $R_{12}$, $R_{13}$, and $R_{14}$, which may be identical or different, are chosen from hydrogen and alkyl radicals comprising from 1 to 4 carbon atoms; and X— is chosen from halides, acetates, phosphates, nitrates, ethyl sulfates, and methyl sulfates; and
quaternary ammonium salts comprising at least one ester function.

Exemplary and non-limiting quaternary ammonium salts of imidazoline may be chosen from those of formula (III) below:

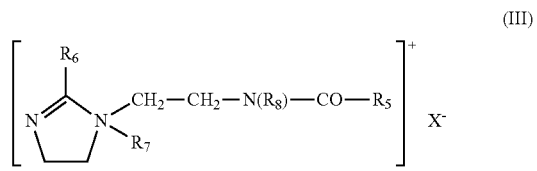

wherein $R_5$ is chosen from alkenyl and alkyl radicals comprising from 8 to 30 carbon atoms; $R_6$ is chosen from hydrogen, C1-C4 alkyl radicals, and alkenyl and alkyl radicals comprising from 8 to 30 carbon atoms; $R_7$ is chosen from C1-C4 alkyl radicals; $R_8$ is chosen from hydrogen and C1-C4 alkyl radicals; and X— is chosen from halides, phosphates, acetates, lactates, alkyl sulfates, alkyl sulfonates, and alkylaryl sulfonates.

By way of example only, the at least one cationic surfactant may be chosen from behenyltrimethylammonium chloride, cetyltrimethylammonium chloride, quaternium-83, quaternium-87, quaternium-22, behenylamidopropyl-2,3-dihydroxypropyldimethylammonium chloride, palmitylamidopropyltrimethylammonium chloride, stearamidopropyldimethylamine, and chloride and methyl sulfates of diacyloxyethyldimethylammonium, of diacyloxyethylhydroxyethylmethylammonium, of monoacyloxyethyldihydroxyethylmethylammonium, of triacyloxyethylmethylammonium, of monoacyloxyethylhydroxyethyldimethylammonium, and mixtures thereof.

For example, the at least one cationic surfactant may be chosen from caprylyl trimethyl ammonium chloride (Aliquat 2); oleyl trimethyl ammonium chloride (Aliquat 11); oleyl-linoleyl trimethyl ammonium chloride (Aliquat 15); dilauryl dimethyl ammonium chloride (Aliquat 204); lauryl heterocyclic tertiary amine (Amine C); cetyl dimethyl ethyl ammonium bromide (Ammonyx DME); cetyl dimethyl benzyl ammonium chloride (Ammonyx T); lauryl trimethyl ammonium chloride (Arquad 12-50); cetyl trimethyl ammonium chloride (Arquad 16-50); stearyl trimethyl ammonium chloride (Arquad 18-50); quaternized 2-amino pentadecane (Arquad L-15); dicoco dimethyl ammonium chloride (Arquad 2C-50); N-cetyl ethyl morpholinium ethosulfate (Atlas G 263); alkenyl dimethyl ethyl ammonium bromide (Barquat OE-50); lauryl isoquinolinium bromide (Barquat IB-75); myristyl dimethyl benzyl ammonium chloride (BTC 1750); stearamido propyl dimethyl B-hydroxyethyl ammonium phosphate (Catanac SP); tetradecyl pyridinium bromide (Fixanol VR); heptadecenyl imidazolinium bromide (Intexan HB-50); quaternary substituted imidazoline of oleic acid (Monaquat OIBC); substituted imidazoline of myristic acid (Monazoline M); coco fatty dialkyl benzyl ammonium chloride (Quatrene CB); fatty glyoxalidinium chloride (Quatrene 0-56); soya fatty dialkyl benzyl ammonium chloride (Quatrene SFB); 1-hydroxyethyl 2-heptadecenyl imidazoline hydrochloride (Romine BTQ); and lauryl dimethyl benzyl ammonium chloride (Vantoc CL).

Exemplary, non-limiting amphoteric surface active agents include derivatives of betaine, derivatives of alkylamphoacetates, derivatives of hydroxylsultaines, and mixtures thereof.

Non-limiting examples of betaine derivatives which may be used include cocobetaine, such as, for example, DEHYTON AB-30® from Cognis, laurylbetaine, such as GENAGEN KB® from Clariant, oxyethylenated laurylbetaine (10 OE), such as LAURYLETHER(10 OE)BETAINE® from Shin Nihon Rica, oxyethylenated stearylbetaine (10 OE), such as STEARYLETHER(10 OE)BETAINE® from Shin Nihon Rica, cocamidopropyl betaine, such as VELVETEX BK 35® from Cognis, and undecylenamidopropyl betaine, such as AMPHORAM U® from Ceca.

Exemplary and non-limiting alkylamphoacetate derivatives include N-cocoyl-N-carboxymethoxyethyl-N-carboxymethyl-ethylenediamine N-di-sodium (INCI name: disodium cocamphodiacetate), such as MIRANOL C2M CONCENTRE NP® from Rhodia Chimie, and N-cocoyl-N-hydroxyethyl-N-carboxymethyl-ethylenediamine N-sodium (INCI name: sodium cocamphoacetate).

Exemplary, non-limiting derivatives of hydroxylsultaines that may be used include Cocamidopropyl hydroxysultaine, such as that sold as REWOTERIC AM® by Golschmidt-Degussa.

The continuous phase may optionally further comprise any additional component that may be desired in the final dispersion, depending on the ultimate intended application. By way of non-limiting example only, the continuous phase may optionally further comprise at least one humectant, sugar, polymer, peptide, UV absorber, sunscreen, dye, etc. In yet further exemplary embodiments, the continuous phase may comprise lipophilic active agents or lipophilic active compounds: retinol (vitamin A) and derivatives thereof, tocopherol (vitamin E) and derivatives thereof, essential oils or unsaponifiable materials (e.g., bergamot, tocotrienol, sesamine, gamma-oryzanol, phytosterols, squalenes, waxes and terpenes), ascorbyl palmitate, vitamin F glycerides, D vitamins, vitamin D2, vitamin D3, retinol, retinol esters, retinyl palmitate, retinyl propionate, carotenes including beta-carotene, D-panthenol, farnesol, farnesyl acetate, salicylic acid and compounds thereof, for instance 5-n-octanoylsalicylic acid, alkyl esters of alpha-hydroxy acids such as citric acid, lactic acid, glycolic acid, asiatic acid, madecassic acid, asiaticoside, the total extract of *Centella asiatica*, beta-glycyrrhetinic acid, alpha-bisabolol, ceramides, for instance 2-oleoylamino-1,3-octadecane, phytanetriol, phospholipids of marine origin rich in polyunsaturated essential fatty acids, ethoxyquine, rosemary extract, balm extract, quercetin, extract of dried microalgae, octyl methoxycinnamate, butylmethoxydibenzoylmethane, octyl triazone, 3,5-di-tert-butyl-4-hydroxy-3-benzylidenecamphor, antibiotics, antifungal agents, anaesthetics, analgesics, antiseptics, antiviral agents, pesticides and herbicides, and mixtures thereof. One of skill in the art will be able to select both the type and amount of optional additional component in order to avoid degradation of the dispersion.

For example, in at least certain embodiments, the continuous phase may optionally comprise at least one lipophilic active agent or compounds. Non-limiting examples include retinol (vitamin A) and derivatives thereof, tocopherol (vitamin E) and derivatives thereof, essential oils or unsaponifiable materials (e.g., bergamot, tocotrienol, sesamine, gamma-oryzanol, phytosterols, squalenes, waxes and terpenes), ascorbyl palmitate, vitamin F glycerides, D vitamins, vitamin D2, vitamin D3, retinol, retinol esters, retinyl palmitate, retinyl propionate, carotenes including beta-carotene, D-panthenol, farnesol, farnesyl acetate, salicylic acid and compounds thereof, for instance 5-n-octanoylsalicylic acid, alkyl esters of alpha-hydroxy acids such as citric acid, lactic acid, glycolic acid, asiatic acid, madecassic acid, asiaticoside, the total extract of *Centella asiatica*, beta-glycyrrhetinic acid, alpha-bisabolol, ceramides, for instance 2-oleoylamino-1,3-octadecane, phytanetriol, phospholipids of marine origin rich in polyunsaturated essential fatty acids, ethoxyquine, rosemary extract, balm extract, quercetin, extract of dried microalgae, octyl methoxycinnamate, butylmethoxydibenzoylmethane, octyl triazone, 3,5-di-tert-butyl-4-hydroxy-3-benzylidenecamphor, antibiotics, antifungal agents, anaesthetics, analgesics, antiseptics, antiviral agents, pesticides and herbicides, and mixtures thereof.

Separately, a solution of silicate salts can be prepared by any method known. The solution may optionally be an aqueous solution, and may comprise any silicate salt soluble in the solvent, such as, by way of non-limiting example, disodium silicate ($Na_2SO_3$), calcium silicate, magnesium silicate, sodium silicate, aluminum silicate, potassium silicate, zirconium silicate, tetramethylammonium silicate, sodium alumino silicate, potassium methyl siliconate, sodium methyl siliconate, and mixtures thereof.

According to various embodiments of the disclosure, the silicate salt solution may comprise an amount of at least one silicate salt in an amount sufficient to prepare a solution having a concentration ranging from about 0.05 to about 0.3 M, such as about 0.08 to about 0.3 M, about 0.05 to about 0.2 M, or about 0.08 to about 0.2 M.

Once the solution comprising at least one silicate salt is prepared, the pH may be adjusted so that silicic acid is produced. The pH may be adjusted by any method known in order to achieve a final pH in the range of about 6.0 to about 10.0, such as about 6.5 to about 9.0, about 6.5 to about 8.5, or about 7.0 to about 8.0.

After the pH of the silicate solution is adjusted, the solution may be mixed with the gas-in-water dispersion in a desired ratio. For example, the ratio of silicate solution:gas-in-water dispersion may range from about 20:80 to about 80:20, such as about 40:60 to about 60:40, or about 50:50.

Upon mixing, encapsulation of the gas bubbles occurs substantially immediately and completely. Without wishing to be bound by theory, it is believed that adsorption of the surface-active material to the gas-water interface in the gas-in-water dispersion renders it positively charged. Then, the process of adjusting the pH of the silicate salt solution creates anionic complexes that are thus attracted to the cationic surface of the gas bubbles upon mixing. It should be noted, however, that in at least certain embodiments, encapsulation may not occur substantially immediately or completely, yet such embodiments are intended to be within the scope of the disclosure.

As can be seen in FIG. 1, which is a schematic of an exemplary method of encapsulating gas bubbles according to an embodiment of the disclosure, in I(a), a dispersion in the form of micron-sized gas bubbles is combined with an aqueous solution comprising at least one cationic surface active agent. In II(a), the at least one cationic surface active agent is adsorbed onto the bubble, rendering it positively charged. In I(b), a silicate salt solution comprising sodium meta-silicate is prepared, and in II(b), the silicate salt solution is pH adjusted, after which, the gas-in-water dispersion and silicate salt solution are combined, resulting in an encapsulated gas bubble.

Methods for preparing encapsulated gas bubbles, and gas-in-water dispersions comprising encapsulated gas bubbles, according to embodiments of the disclosure may be useful for preparing aerated compositions (e.g. foam compositions) for use in a variety of industries, such as, by way of non-limiting example, food, personal care (e.g. cosmetic, dermatological, skin care, hair care, etc.), pharmaceutical, and consumer chemical (e.g. household products). It may also be possible to incorporate encapsulated bubbles and/or gas-in-water dispersions prepared according to embodiments of the disclosure into compositions or emulsions (e.g. O/W, W/O, W/O/W, etc.) for use in a variety of industries, such as, by way of non-limiting example, food, personal care, pharmaceutical, and consumer chemical. As such, compositions, dispersions, and products comprising gas-in-water dispersions according to embodiments of the disclosure, or comprising gas bubbles encapsulated according to embodiments of the disclosure, are further intended to be within the scope of the disclosure.

In at least certain exemplary embodiments according to the disclosure, the formulations, dispersions, and products comprising gas bubbles encapsulated according to various embodiments of the disclosure may be stable for a period of several months, such as up to about 24 months, up to about 18 months, up to about 12 months, or up to about 6 months, at room temperature. It should be noted, however, that stability may vary according to various embodiments of the disclosure, and/or formulations, dispersions, and/or products made according to embodiments described herein may not offer improved stability over an extended period of time, yet such embodiments are intended to be within the scope of the disclosure.

As described herein, steps of various processes and procedures are listed in a certain order. However, it is to be understood that, unless explicitly stated otherwise, the order of performing the steps in the processes or procedures is not critical, and thus, processes and procedures having the specified steps, but in a different order, are likewise intended to be within the scope of the disclosure.

Unless otherwise indicated, all numbers used in the specification and claims are to be understood as being modified in all instances by the term "about," whether or not so stated. It should also be understood that the precise numerical values used in the specification and claims form additional embodiments of the invention, and are intended to include any ranges which can be narrowed to any two end points disclosed within the exemplary ranges and values provided. Efforts have been made to ensure the accuracy of the numerical values disclosed herein. Any measured numerical value, however, can inherently contain certain errors resulting from the standard deviation found in its respective measuring technique.

All patents and published applications mentioned herein are incorporated by reference in their entireties.

EXAMPLE

The following Example is intended to be non-restrictive and explanatory only, with the scope of the invention being defined by the claims.

Example

Stable Dispersion

An aqueous solution of cetyl trimethyl ammonium chloride surfactant was prepared (0.9 mM). Air bubbles were mixed with the aqueous solution to generate a gas-in-water dispersion.

An aqueous solution of $Na_2SiO_3$ solution (0.18 M) was prepared (pH was about 12). The pH was adjusted to about 8.5 using an HCl solution (4.6 mL of HCl 23 wt % per 100 mL $Na_2SiO_3$ solution).

Immediately after the pH of the $Na_2SiO_3$ solution was adjusted, the gas-in-water dispersion and $Na_2SiO_3$ solution were mixed 50:50 by volume.

Figure 2A:
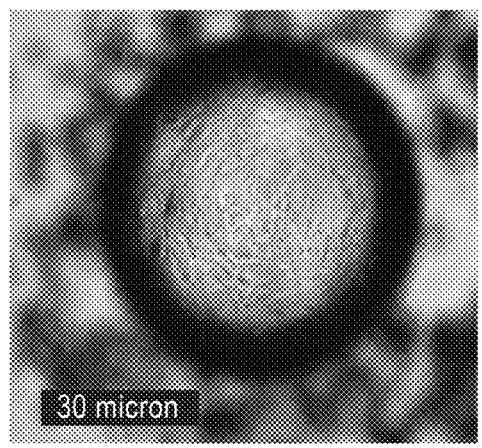
FIG. 2A is an optical microscope image of encapsulated gas bubbles prepared according to an exemplary embodiment of the disclosure.
Figure 2B:
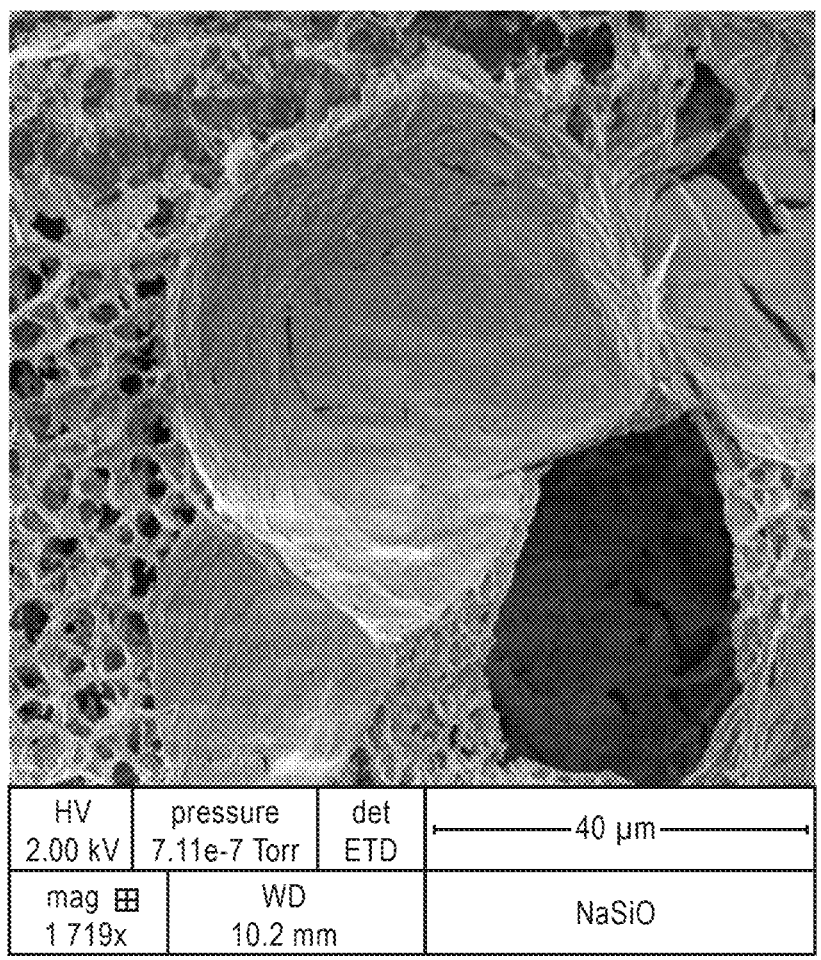
FIG. 2B is an SEM image of encapsulated gas bubbles prepared according to an exemplary embodiment of the disclosure.

Encapsulation of the gas bubbles was seen substantially immediately, although it was also noted that there was an excess of $Na_2SiO_3$ solution which gelled in the bulk excess solution. An optical microscope image of the encapsulated gas bubbles can be seen in FIG. 2A, and an SEM image of the encapsulated gas bubbles can be seen in FIG. 2B. The dispersion was kept at pH 6 at room temperature (23° C., ±5° C.) for over two years, and remained stable.

What is claimed is:

1. A method for encapsulating bubbles, said method comprising mixing a gas-in-water dispersion and a solution comprising at least one silicate salt, wherein:
   a. the gas-in-water dispersion comprises at least one cationic surface active agent in the aqueous phase, and a dispersed gas phase comprising bubbles; and
   b. the solution comprising at least one silicate salt has a pH ranging from about 6.0 to about 10.0;
   wherein the volume of the gas phase in the gas-in-water dispersion comprises less than about 60% of the gas-in-water dispersion.

2. The method according to claim 1, wherein the size of the gas bubbles ranges from about 10 µm to about 1000 µm.

3. The method according to claim 1, wherein the gas phase comprise at least one gas chosen from chosen from $O_2$, $N_2$, $CO_2$, $N_2O$, helium, and combinations thereof.

4. The method according to claim 1, wherein the concentration of the at least one cationic surface active agent ranges from about 1 to about 25 times CMC.

5. The method according to claim 1, wherein the at least one cationic surface active agent is chosen from optionally polyoxyalkylenated primary, secondary and tertiary fatty amines, quaternary ammonium salts, and mixtures thereof.

6. The method according to claim 1, wherein the at least one cationic surface active agent is chosen from at least one amphoteric surface active agent that has been pH-adjusted to be cationic.

7. The method according to claim 6, wherein the at least one cationic surface active agent chosen from at least one amphoteric surface active agent that has been pH-adjusted to be cationic is chosen from derivatives of betaine, derivatives of alkylamphoacetate, derivatives of hydroxylsultaines, and mixtures thereof.

8. The method according to claim 1, wherein the solution comprising at least one silicate salt has a concentration ranging from about 0.05 M to about 0.3 M.

9. The method according to claim 1, wherein the at least one silicate salt is chosen from disodium silicate, calcium silicate, magnesium silicate, sodium silicate, aluminum silicate, potassium silicate, zirconium silicate, tetramethylammonium silicate, sodium alumino silicate, potassium methyl siliconate, sodium methyl siliconate, and mixtures thereof.

10. The method according to claim 1, wherein mixing the gas-in-water dispersion and the solution comprising the at least one silicate salt comprises mixing the gas-in-water dispersion and the solution comprising at a ratio of silicate solution:gas-in-water dispersion ranging from about 20:80 to about 80:20.

11. A method for preparing a gas-in-water dispersion, said method comprising the steps of:
   a. preparing an aqueous solution having at least one cationic surface active agent;
   b. preparing a gas phase;
   c. mixing said aqueous solution having at least one cationic surface active agent and said gas phase to obtain an gas-in-water dispersion comprising gas bubbles;
   d. preparing a solution comprising at least one silicate salt;
   e. adjusting the pH of the solution comprising the at least one silicate salt to a range of from about 6.0 to about 10.0; and
   f. mixing the gas-in-water dispersion and the solution comprising the at least one silicate salt;
   wherein the volume of the qas phase in the qas-in-water dispersion comprises less than about 60% of the qas-in-water dispersion.

12. The method according to claim 11, wherein the size of the gas bubbles ranges from about 10 µm to about 1000 µm.

13. The method according to claim 11, wherein the gas phase comprise at least one gas chosen from chosen from $O_2$, $N_2$, $CO_2$, $N_2O$, helium, and combinations thereof.

14. The method according to claim 11, wherein the concentration of the at least one cationic surface active agent ranges from about 1 to about 25 times CMC.

15. The method according to claim 11, wherein the at least one cationic surface active agent is chosen from optionally polyoxyalkylenated primary, secondary and tertiary fatty amines, quaternary ammonium salts, and mixtures thereof.

16. The method according to claim 11, wherein the at least one cationic surface active agent is chosen from at least one amphoteric surface active agent that has been pH-adjusted to be cationic.

17. The method according to claim 16, wherein the at least one cationic surface active agent chosen from at least one amphoteric surface active agent that has been pH-adjusted to be cationic is chosen from derivatives of betaine, derivatives of alkylamphoacetate, derivatives of hydroxylsultaines, and mixtures thereof.

18. The method according to claim 11, wherein the solution comprising at least one silicate salt has a concentration ranging from about 0.05 M to about 0.3 M.

19. The method according to claim 11, wherein the at least one silicate salt is chosen from disodium silicate, calcium silicate, magnesium silicate, sodium silicate, aluminum silicate, potassium silicate, zirconium silicate, tetramethylammonium silicate, sodium alumino silicate, potassium methyl siliconate, sodium methyl siliconate, and mixtures thereof.

20. The method according to claim 11, wherein mixing the gas-in-water dispersion and the solution comprising the at least one silicate salt comprises mixing the gas-in-water dispersion and the solution comprising at a ratio of silicate solution:gas-in-water dispersion ranging from about 20:80 to about 80:20.

21. A gas-in-water dispersion comprising gas bubbles in the dispersed phase, wherein said gas bubbles are encapsulated by silicic acid, and wherein the volume of the gas phase in the gas-in-water dispersion comprises less than about 60% of the gas-in-water dispersion.

22. The gas-in-water dispersion according to claim 21, wherein the aqueous phase comprises at least one cationic surface active agent.

23. The gas-in-water dispersion according to claim 21, wherein the dispersion is stable for at least 6 months at room temperature.

* * * * *